United States Patent [19]

Sanner

[11] 4,376,850

[45] Mar. 15, 1983

[54] AQUEOUS PHASE POLYMERIZATION OF WATER MISCIBLE MONOMERS

[75] Inventor: James W. Sanner, Midland, Mich.

[73] Assignee: The Dow Chemical Company, Midland, Mich.

[21] Appl. No.: 264,492

[22] Filed: May 18, 1981

[51] Int. Cl.³ .......... C08F 4/52

[52] U.S. Cl. .......... 526/196; 526/288; 526/303.1; 526/310; 524/817; 524/831; 524/827

[58] Field of Search .......... 526/196

[56] References Cited

U.S. PATENT DOCUMENTS

| | | | |
|---|---|---|---|
| 2,728,757 | 12/1955 | Field et al. | 526/95 |
| 2,963,459 | 12/1960 | Nicholson | 526/178 |
| 3,255,168 | 6/1966 | Borsini | 526/196 |
| 3,275,611 | 9/1966 | Motius et al. | 526/197 |
| 3,332,922 | 7/1967 | Hoover | 526/86 |
| 3,396,154 | 8/1968 | Chamberlin et al. | 526/82 |
| 4,145,495 | 3/1979 | Robinson et al. | 526/93 |

FOREIGN PATENT DOCUMENTS

| | | | |
|---|---|---|---|
| 835674 | 5/1960 | United Kingdom | 526/194 |
| 1123723 | 8/1968 | United Kingdom | 526/196 |

OTHER PUBLICATIONS

Def. Pub. T875,006, W. S. Zimmt.

Ventron–Redox Initiator Systems Based on Sodium Borohydride, Brochures 1 and 2.

*Primary Examiner*—Joseph L. Schofer
*Assistant Examiner*—Peter F. Kulkosky

[57] ABSTRACT

Water miscible monomers such as acrylamide are polymerized in an aqueous phase in the presence of an initiator containing a borohydride such as sodium borohydride and an easily reduced metal ion such as cupric ion.

17 Claims, No Drawings

AQUEOUS PHASE POLYMERIZATION OF WATER MISCIBLE MONOMERS

BACKGROUND OF THE INVENTION

This invention relates to the polymerization of water miscible monomers in aqueous media.

Most water-soluble polymers, particularly polymers of acrylamide, acrylic acid and their water miscible derivatives, have been employed commercially as additives in the manufacture of paper products, as water purification coagulants, as flocculants for a wide variety of aqueous dispersions such as sewages and industrial waste water, as the fluid mobility control agents in enhanced oil recovery, and as treating agents in a wide variety of other applications.

Of the various methods employed to polymerize water miscible monomers, aqueous phase polymerization methods wherein the monomer is dissolved in the aqueous phase at the onset of polymerization are the most commonly employed. Such methods are less expensive and readily provide water-soluble polymers having the high molecular weight that is essential for many applications. In such methods, the concentrations of monomer and resulting polymer in the aqueous phase are maintained as high as possible in order to maximize the capacity of the polymerization apparatus and to minimize the amount of water in the resulting polymer product. Unfortunately, however, polymerization of such water miscible monomers to high molecular weight, or polymerization in solutions of more than 15 weight percent of the monomer often yields gel-like products which are difficult to dilute and which contain a substantial portion of water-insoluble solid. The presence of the latter is particularly troublesome when a polymer is to be employed in enhanced oil recovery applications wherein an aqueous solution of the polymer is passed through a porous subterranean zone in the manner described by U.S. Pat. No. 3,039,529.

As is well known, such aqueous phase polymerizations are normally initiated by a free radical generating catalyst which is activated by the removal of the oxygen that is normally present in the polymerization medium. Of particular interest are the redox catalyst systems which employ an oxidizing free radical generator such as a peroxide or a persulfate and a reducing component such as sulfur dioxide or a bisulfite. While such redox catalyst systems bring about a rapid polymerization, the resulting polymers often have wide molecular weight distribution including substantial quantities of water-soluble gel-like product. In addition, it is often observed that without the addition of high temperature polishing catalysts, as much as 1 or 2 percent of a water-soluble monomer is not polymerized at all and thus must be removed. Finally, and most importantly, the reducing component of the conventional redox catalyst system is often extremely sensitive to oxygen at higher temperatures; therefore, oxygen must be carefully removed prior to the initiation of polymerization. Accordingly, initiation of polymerization is often an unpredictable operation wherein initiation may be rapid and easy to achieve on one occasion and slow and very difficult to achieve on a second occasion under essentially the same conditions. As a result, commercial operation of the polymerization to produce a uniform product is often very difficult.

In view of the problems existing in the prior art of polymerizing water-soluble monomers in an aqueous phase to produce water-soluble polymers, it is highly desirable to provide such a process wherein initiation can be rapidly and uniformly achieved and polymerization can be conducted at a rapid rate to form water-soluble polymer having the desired molecular weight and molecular weight distribution.

SUMMARY OF THE INVENTION

The present invention is such a polymerization process which comprises (1) contacting an aqueous phase containing a water miscible monomer with an initiating amount of an initiator containing a metal borohydride and a metal ion that can be reduced by the borohydride and (2) subjecting the resulting aqueous phase to conditions sufficient to polymerize the monomer to form the desired water-soluble polymer. Preferably, the initiator is a redox initiator which also contains a free radical generating oxidizing agent and the metal ion can be reduced by the borohydride to an oxidation state from which the reduced metal ion can be oxidized by the oxidizing agent.

Surprisingly, by the practice of the present invention, the water-soluble polymer is recovered in a form that contains substantially less very high molecular weight product than is contained in polymers produced by conventional processes using conventional redox catalyst systems. Accordingly, the resulting aqueous phase containing the water-soluble polymer can contain greater concentrations of polymer at a given viscosity than can conventional polymerization recipes. In the process of the present invention, polymerization is easier to initiate and easier to carry out to produce a more uniform polymer product than in most conventional polymerization processes. Finally, the rate of conversion of monomer in the practice of this process is greater. As a result of this increased rate of conversion, the polymer product contains unreacted monomer in concentrations as low as 0.5 part per million.

The polymers prepared in accordance with the practice of this invention are useful in the same applications as similar water-soluble polymers prepared by conventional polymerization methods. Examples of such applications include additives for the manufacture of paper, agents for the treatment of sewage and industrial waste water, thickeners, dispersing agents, and fluid mobility control agents for use in enhanced oil recovery.

DETAILED DESCRIPTION OF THE REPRESENTATIVE EMBODIMENTS

Water miscible monomers suitably employed in the practice of this invention are those ethylenically unsaturated monomers which are sufficiently water miscible to form a single aqueous phase when 5 weight parts of the monomer are dispersed in 100 weight parts of water. Such monomers readily undergo addition polymerization to form polymers which are at least inherently water-dispersible and preferably water-soluble. By "inherently water-dispersible," it is meant that the polymer when contacted with an aqueous medium, will disperse therein without the aid of surfactants to form a colloidal dispersion of the polymer in the aqueous media. Preferably, such polymers are sufficiently water-soluble that they will form at least a 5 weight percent solution when dissolved in water.

Exemplary water miscible monomers include the water miscible ethylenically unsaturated amides such as acrylamide, methacrylamide and fumaramide; water miscible N-substituted ethylenically unsaturated amides such as N-(N',N'-dialkylaminoalkyl)acrylamide, e.g., N-(N',N'-dimethylaminomethyl)acrylamide and quaternized derivatives thereof such as acrylamide methyl trimethyl ammonium chloride and 3-(methacrylamido)-propyl trimethyl ammonium chloride and N-substituted alkylol acrylamide such as N-methylol acrylamide; ethylenically unsaturated carboxylic acids such as acrylic acid, methacrylic acid, fumaric acid and the like; ethylenically unsaturated quaternary ammonium compounds such as vinylbenzyl trimethylammonium chloride; sulfoalkyl esters of carboxylic acids such as 2-sulfoalkyl methacrylate as well as the alkali metal and ammonium salts thereof; aminoalkyl esters and quaternary ammonium alkyl of unsaturated carboxylic acids such as 2-aminoethyl methacrylate and 2-acryloylethyl trimethyl ammonium chloride and 2-methacryloylethyl trimethyl ammonium chloride; vinyl aryl sulfonates such as vinylbenzene sulfonate as well as the alkali metal and ammonium salts thereof; diallyl quaternary ammonium compounds such as dimethyl diallyl ammonium chloride, methyl triallyl ammonium chloride, diethyl diallyl ammonium chloride and other diallyl dialkyl ammonium salts; N-(sulfoalkyl)acrylamides and methacrylamides such as N-(2-sulfo-1,1-dimethylethyl)acrylamide; ethylenically unsaturated amines such as allyl and diallylamine and the like. Of the foregoing water miscible monomers, acrylamide and the water miscible derivatives of acrylamide as well as acrylic acid and methacrylic acid and mixtures of such monomers are preferred. Especially preferred are acrylamide and mixtures of acrylamide and acrylic acid containing from about 10 to about 30 weight percent of acrylic acid.

In addition to the metal borohydride, it is essential that a promoter metal ion be present in trace amounts in order to generate free radicals. Such metal ions include cupric, mercuric, stannic, or other metal ion that is capable of being reduced by the borohydride to a state from which the metal ion can be oxidized back to its original oxidation state, preferably by the oxidizing agent of the redox initiator. Of the metal ions, cupric is the most preferred. In regard to this metal ion, it should be understood that it is not necessary to add such metal ion if it is present as an impurity in the monomer. This is often the case with acrylamide wherein cupric ion is typically present as an impurity.

As the oxidizing agent of the preferred redox initiator system, any compound known to be suitable as the oxidizing component of a conventional redox catalyst is suitably employed. Examples of such oxidizing agents are the alkali metal or ammonium persulfates, alkali metal peroxides, organic peroxides such as t-butyl peroxides, organic hydroperoxides, alkali metal perborates, alkali metal perphosphates, peracids, peresters, percarbonates and other peroxygen compounds capable of disassociating into free radicals. Of these peroxygen compounds, the organic peroxides are preferred. Especially preferred oxidizing agents are combinations of organic peroxides or hydroperoxides such as t-butyl hydroperoxide with alkali metal persulfates such as sodium persulfate and potassium persulfate. It is understood that the oxidizing agent may be present as an impurity in the monomer, thus it need not be added to provide the preferred redox initiator.

The initiator employed in the practice of this invention is a metal borohydride, preferably an alkali metal or alkaline earth metal borohydride such as sodium borohydride or calcium borohydride. While the borohydride can be suitably employed as the primary component of the initiator, it is preferably employed as the reducing component of a redox initiator. In addition to acting as a reducing component, the metal borohydride also acts as a chain transfer agent which is effective to lower the molecular weight of the resulting polymer product. Of the metal borohydrides, the alkali metal borohydrides are preferred, with sodium borohydride being especially preferred.

In addition to the foregoing components, it is also suitable to employ other ingredients which are common to conventional aqueous phase polymerization of water miscible monomers. For example, the present invention can be practiced using a disperse aqueous phase polymerization wherein the aqueous phase containing the monomers and an initiator system is dispersed in hydrocarbon using an emulsifier which promotes the formation of a water-in-oil emulsion. Exemplary organic liquids, emulsifiers and conditions for preparing such water-in-oil emulsions are described in greater detail in U.S. Pat. Nos. 3,284,393; 3,624,091; and 3,734,873 which are hereby incorporated by reference. Also, it is suitable and often preferred to include in the aqueous phase a chelating agent such as an EDTA type material. Such chelating agents react with the metal ion to form a complex of the ion and the chelant.

In the practice of the process of the present invention, it is preferable to dissolve a single monomer or a mixture of monomers into an aqueous medium. The concentration of monomer in the aqueous medium is suitably any concentration which upon polymerization will yield a polymerization product which is essentially free of water-insoluble gels and contains little or no unreacted monomer. Preferably, such concentrations of monomer are within the range from about 3 to about 25, most preferably from about 10 to about 18, weight percent of monomer based on the weight of the aqueous phase. At this point, the aqueous phase containing monomer can be combined with the initiator system of the present invention and subjected to polymerization conditions. Alternatively, such aqueous phase can be dispersed in an oil phase to produce a water-in-oil emulsion by a procedure as mentioned hereinbefore. This emulsion is then combined with the redox initiator system of the present invention and subjected to polymerization conditions.

In carrying out polymerization by the process of this invention, it is possible and often preferred to combine the preferred redox initiator system of this invention with the remaining components of the polymerization recipe prior to the removal of oxygen from the polymerization recipe. This practice is believed to be unique in the polymerization of water-soluble monomers in aqueous phase. Such is believed to be due to the fact that the sodium borohydride is not as sensitive to oxygen as many of the conventional reducing agents such as bisulfite are. As one benefit of this practice, it is possible to initiate polymerization more readily and more uniformly than with conventional recipes. In addition, such practice is also more amenable to continuous polymerization procedures than are the more conventional processes. However, it is also possible and, in some instances, preferred to practice the process of this invention in a conventional manner wherein oxygen is carefully purged from the aqueous phase containing monomer prior to the inclusion of the redox initiator components.

The initiator is employed in amounts sufficient to initiate polymerization upon the removal of oxygen from the polymerization recipe. The amount of borohydride is that amount which will initiate the formation of polymer as indicated by the evolution of heat and/or the increase in viscosity of the reaction mixture. Preferably, the amount of borohydride is in the range from about 0.5 to about 100, preferably from about 0.5 to about 20, weight parts of borohydride per million weight parts of monomer. The amount of metal ion present in the system is the amount which will promote the formation of free radicals. As indicated hereinbefore, the metal ion may be added to the polymerization recipe as a component of the initiator or the metal ion may be present in sufficient quantities as an impurity in the aqueous phase containing the monomeric component. Preferably, the metal ion is present in a concentration from about 1 to about 50, most preferably from about 15 to about 25, weight parts of metal ion per million weight parts of monomer.

In the preferred redox initiator, the concentration of the oxidizing agent is sufficient to generate desired population of free radicals in the polymerization zone. Preferably, the oxidizing agent is present in an amount in the range from about 50 to about 1000, most preferably from about 50 to about 500, weight parts of oxidizing agent per million weight parts of monomer. As stated hereinbefore, the oxidizing agent may be added to the polymerization recipe as a component of the preferred redox initiator or it may be present in sufficient quantities as an impurity in the monomer.

In order to initiate polymerization, it is necessary to remove substantially all of the oxygen from the polymerization recipe. While any of a variety of well-known procedures for removing or significantly reducing the amount of oxygen in the polymerization recipe can be suitably employed in the practice of this invention, it is generally desirable to effect the removal of the oxygen by purging the polymerization recipe with nitrogen or carbon dioxide or some other inert gas prior to, subsequent to and/or during the addition of the initiator to the polymerization recipe. In practice, it is found that polymerization will begin if suitable concentration of the initiator is present in the polymerization recipe wherein the level of oxygen is reduced to one below 0.2 weight part of oxygen per million weight parts of monomer. The temperature of the polymerization recipe during polymerization is one which is sufficient to progress polymerization to the point of completion such that essentially all monomer, e.g., more than 99 weight percent of total monomer, is converted to polymer. Preferably, the temperature of polymerization is one within the range from about 15° to about 50° C., most preferably from about 20° to about 30° C. During polymerization, it is advantageous to maintain the pH of the polymerization recipe within the range from about 5 to about 14, preferably from about 6 to about 12. In normal practice of the invention, such maintenance of pH is normally achieved by adjusting the pH of the recipe to the desired value within the aforementioned range prior to polymerization as the reactions taking place during polymerization do not significantly affect pH of the polymerization recipe. The length of the reaction time is not particularly critical so long as the polymerization recipe remains under polymerization conditions for a time sufficient to polymerize essentially all of the monomer. Normally, such polymerization occurs within a period from about 1 to about 6, preferably from about 1 to about 3, hours. Recovery of the polymer from the polymerization zone is readily achieved by conventional procedures, particularly since the polymer product contains a higher concentration of polymer and normally exhibits a lower viscosity than is common of most water-soluble polymers prepared by conventional redox polymerization.

The following examples are given to illustrate the preferred embodiments of the present invention and should not be construed as limiting its scope. Unless otherwise indicated, all parts and percentages are by weight.

EXAMPLE 1

To an aqueous solution containing 21 percent of acrylamide is added sufficient sodium carbonate to yield a 35 percent concentration based on acrylamide and sufficient sodium sulfate to yield 5.7 weight percent of sodium sulfate based on acrylamide. A resulting mixture is purged with nitrogen for 30 minutes to remove oxygen and 3000 parts of the pentasodium salt of (carboxymethylamino)-bis-(ethylene nitrilo)tetraacetic acid (hereinafter called V-80) per million parts of acrylamide is added to the aqueous solution of monomer. The resulting mixture is added to a 1 liter resin kettle and 600 parts of t-butyl hydroperoxide (TBHP) per million parts of acrylamide, 60 parts of sodium persulfate per million parts of acrylamide and different amounts of sodium borohydride as indicated in Table I are added with stirring to initiate polymerization. The polymerization recipe is heated to 90° C. and maintained at that temperature for 3 hours. The resulting polymer product is removed from the resin kettle and steam distilled for 3 hours. The polymer samples from each run employing a different amount of sodium borohydride are then dried and analyzed for viscosity. The results are reported in Table I.

TABLE I

| Sample No. | $NaBH_4$(1), ppm | Viscosity(2), cps |
|---|---|---|
| 1 | 5 | 40.5 |
| 2 | 15 | 25.2 |
| 3 | 25 | 19.0 |

(1)Concentration of $NaBH_4$ in parts per million parts of acrylamide.
(2)Ostwald viscosity (25° C., 0.3 percent polymer in a 4 percent NaCl aqueous solution).

The polymer samples obtained in this example are readily dissolved in water at concentrations of 0.5 percent to produce aqueous solutions which are reasonably fluid and contain essentially no gels or other water-insoluble product. These polymers are hydrolyzed polyacrylamide containing from about 15 to about 35 percent of hydrolyzed amide (acid moiety).

EXAMPLE 2

To an aqueous solution containing 21 percent of acrylamide which solution has been purged with nitrogen for 30 minutes to remove oxygen is added 2000 parts per million of the pentasodium salt used in Example 1, 600 parts per million of tertiary butyl hydroperoxide, 60 parts per million of sodium persulfate, and different amounts of sodium borohydride as indicated in Table II, with all of the foregoing parts being based on monomer. The addition is carried out at room temperature and the resulting mixture is charged to an insulated reactor which is heated with a heating mantle for 2 hours. The reactor is then heated in a water bath at 90° C. for 2 hours. The resulting polymer product is combined with 1 percent of a dryer release agent (both percentages being based on monomer weight) and 2 percent of sodium sulfite, steam distilled for 3 hours and ground into small parts using a meat grinder. The resulting particles are dried and analyzed with the results being reported in Table II.

TABLE II

| Sample No. | $NaBH_4$(1), ppm | Viscosity(2), cps |
|---|---|---|
| 1 | 5 | 44 |
| 2 | 25 | 8.5 |

(1)-(2)Same as in Table I.

EXAMPLE 3

To 259.42 g of a 48.5 percent solution of acrylamide in water is added 53.86 g of glacial acrylic acid and 3.92 g of a 10 percent solution of V-80 in water. The pH of the resulting mixture is adjusted to 8 by adding a 50 percent solution of NaOH in water. This mixture is then diluted to 490 g with water and the pH is readjusted to pH of 8 as necessary. An oil phase is prepared by dissolving 3.92 g of sorbitan monooleate and 5.88 g of isopropanol amide of oleic acid in 90.2 g of Isopar ® M (a mixture of isoparaffinic hydrocarbons having a flash point of 170° F.). The aqueous phase is then added to the oil phase in a Waring Blendor and blended at high rpm for 1 minute. The emulsion is transferred to a 1 liter reaction vessel. One ml of a solution of 1.28 g of a 70 percent solution of t-butyl hydroperoxide in water is diluted to 10 ml with water and added to the emulsion. The emulsion is purged with nitrogen for 1 hour with vigorous agitation. Then three ml portions of a 0.1 percent solution of $NaBH_4$ in 0.1 N NaOH (30 parts of $NaBH_4$ per million parts of monomer per portion) are added to the emulsion with stirring at 5 minute intervals. After the last portion of $NaBH_4$ is added, there is an immediate exotherm, with the temperature of emulsion rising from 15° to 35° C. over a period of 35 minutes. Another similar portion of $NaBH_4$ is added thereby causing another vigorous exotherm. The reaction temperature is maintained between 45°-50° C. with no initiator being added for the following 45 minutes. Then the additional portions of $NaBH_4$ (60 ppm, 120 ppm and 300 ppm, respectively) are added at 5 minute intervals. The portion of $NaBH_4$ produces no exotherm. The emulsion is filtered through a 100 mesh cloth. To a 200 gram sample of the emulsion is added a solution of 4.5 g of $Na_2CO_3$ in 22 g of $H_2O$ containing 2 g of a polyethylene glycol ether of a secondary alcohol sold by Union Carbide under the trade name Tergitol 15-S-9. The emulsion inverts in a 4 percent solution of NaCl in water to yield an aqueous solution (0.3 percent polymer) having an Ostwald viscosity of 25.5 cps. A 0.05 percent solution of the polymer in a 3 percent solution of NaCl in water exhibits a screen factor of 50. The test for measuring screen factor is described in *Water Soluble Polymers* (edited by H. M. Bilas), Plenum Publishing Corporation, New York, N.Y., pp. 114-119 (1973).

EXAMPLE 4

Following the procedure of Example 3, except that the pH of the aqueous monomer phase is adjusted to 7.0 instead of 8, an emulsion is prepared wherein the $NaBH_4$ is added in 5 portions, each containing 120 ppm $NaBH_4$ based on monomer. The portions are added at 20 minute intervals. The resulting aqueous solution of polymer after inversion of the emulsion exhibits an Ostwald viscosity of 26 cps (0.3 percent polymer in a 4 percent NaCl aqueous solution at 25° C.) and a screen factor of 36.5 (0.05 percent polymer in a 3 percent NaCl aqueous solution).

EXAMPLE 5

Following the procedure of Example 3, except that the pH of the aqueous monomer phase is adjusted to 9.0, an emulsion is prepared wherein the $NaBH_4$ is added in 4 portions, each containing 3 ppm $NaBH_4$ based on monomer. The portions are added at approximately 10 minute intervals. The resulting aqueous solution of polymer after inversion of the emulsion exhibits an Ostwald viscosity of 21.5 cps (0.3 percent polymer in a 4 percent NaCl aqueous solution at 25° C.) and a screen factor of 36.5 (0.05 percent polymer in a 3 percent NaCl aqueous solution).

EXAMPLE 6

Following the procedure of Example 1, except that TBHP is not employed in the initial stage of polymerization and the aqueous monomer phase is adjusted to a pH of 8, an emulsion is prepared wherein a single portion of $NaBH_4$ (1200 ppm based on monomer) is added to the emulsion. After purging the emulsion for 1 hour with $N_2$, there is a vigorous exotherm to 48° C. The temperature then slowly drops to 40° C. and a portion of TBHP (60 ppm based on monomer) is added to the emulsion. The reaction continues as indicated by an exotherm to 60° C. The emulsion is cooled to 40° C. and another portion of TBHP (60 ppm based on monomer) is added, with no exotherm being observed. The emulsion is recovered and inverted according to the procedure of Example 3. The resulting aqueous solution of polymer exhibits an Ostwald viscosity of 10 cps (0.3 percent polymer in a 4 percent NaCl aqueous solution at 25° C.) and a screen factor of 12 (0.05 percent polymer in a 3 percent NaCl aqueous solution at 25° C.).

What is claimed is:

1. A process for polymerizing water miscible monomers which process comprises (1) contacting an aqueous phase containing a water miscible monomer with an initiating amount of an initiator containing a metal borohydride and a metal ion that can be reduced by the borohydride and (2) subjecting the resulting aqueous phase to conditions of aqueous phase polymerization sufficient to polymerize the monomer to form a water-soluble polymer.

2. The process of claim 1 wherein the initiator is a redox initiator containing a free radical generating oxidizing agent, a metal borohydride and a metal ion that can be reduced by the borohydride to an oxidation state from which the reduced metal ion can be oxidized by the oxidizing agent.

3. The process of claim 2 wherein the metal borohydride is an alkali metal borohydride.

4. The process of claim 3 wherein the alkali metal is sodium.

5. The process of claim 4 wherein the metal ion is cupric ion.

6. The process of claim 5 wherein the monomer is acrylamide or a mixture of acrylamide and at least one other water miscible monomer.

7. The process of claim 5 wherein the monomer is acrylamide, acrylic acid or a mixture containing acrylamide and acrylic acid.

8. The process of claim 5 or 6 wherein the aqueous phase is the disperse phase of a water-in-oil emulsion.

9. The process of claim 8 wherein the oxidizing agent is a free radical generating peroxygen compound.

10. The process of claim 9 wherein the peroxygen compound is an organic peroxide or hydroperoxide.

11. The process of claim 9 wherein the peroxygen compound is t-butyl hydroperoxide.

12. The process of claim 6 wherein the other water miscible monomer is an N-(sulfoalkylacrylamide) or an N-(sulfoalkyl)methacrylamide.

13. The process of claim 12 wherein the water miscible monomer is N-(2-sulfo-1,1-dimethylethyl)acrylamide.

14. The process of claim 6 wherein the other water miscible monomer is a diallyl quaternary ammonium compound.

15. The process of claim 14 wherein the diallyl quaternary ammonium compound is dimethyl diallyl ammonium chloride.

16. The process of claim 6 wherein the water miscible monomer is 2-acryloylethyl trimethyl ammonium chloride or 2-methacryloylethyl trimethyl ammonium chloride.

17. The process of claim 6 wherein the other water miscible monomer is 3-(methacrylamido)propyl trimethyl ammonium chloride.

* * * * *